United States Patent
Hsiao et al.

(10) Patent No.: US 8,697,826 B2
(45) Date of Patent: Apr. 15, 2014

(54) SELF-CROSSLINKABLE LATEX POLYMER AND METHOD FOR MAKING THE SAME

(75) Inventors: Hong-Cheng Hsiao, Lin Yuan Hsiang (TW); Ming-Huang Hsu, Lin Yuan Hsiang (TW)

(73) Assignee: Nantex Industry Co., Ltd., Kahsiung (TW)

( * ) Notice: Subject to any disclaimer, the term of this patent is extended or adjusted under 35 U.S.C. 154(b) by 206 days.

(21) Appl. No.: 12/909,174

(22) Filed: Oct. 21, 2010

(65) Prior Publication Data

US 2012/0101244 A1    Apr. 26, 2012

(51) Int. Cl.
*C08F 220/06* (2006.01)

(52) U.S. Cl.
USPC ..................................... 526/329.1

(58) Field of Classification Search
USPC ............................................. 526/329.1
See application file for complete search history.

(56) References Cited

U.S. PATENT DOCUMENTS

| 5,089,576 A * | 2/1992 | Tsuji et al. .................. 526/228 |
| 6,794,475 B1 * | 9/2004 | Bialke et al. ................ 526/320 |

* cited by examiner

*Primary Examiner* — Robert D. Harlan
(74) *Attorney, Agent, or Firm* — Jianq Chyun IP Office

(57) ABSTRACT

A self-crosslinkable latex polymer includes: a polymer chain having a plurality of ethylenically unsaturated units; and a plurality of peroxide functional groups bonded to the polymer chain and having a structure represented by $-R_1-C-O-O-R_2$ or $-R_4-(COO)-C-O-O-R_5$, wherein $R_1$ and $R_4$ each represents a hydrocarbon group and is bonded to the polymer chain and $R_2$ and $R_5$ each represents hydrogen or an alkyl group having 1 to 12 carbon atoms.

5 Claims, No Drawings

SELF-CROSSLINKABLE LATEX POLYMER AND METHOD FOR MAKING THE SAME

BACKGROUND OF THE INVENTION

1. Field of the Invention

The invention relates to a self-crosslinkable latex polymer and a method for making the same, more particularly to a self-crosslinkable latex polymer having a polymer chain and a plurality of peroxide functional groups bonded to the polymer chain.

2. Description of the Related Art

U.S. Pat. No. 5,089,576 discloses a conventional process of producing conjugated diene copolymer. The method includes copolymerizing a monomer mixture of butadiene and acrylonitrile in the presence of a bifunctional peroxide or a bifunctional peroxycarbonate under a temperature ranging from 40 to 130° C. The bifunctional peroxide and the bifunctional peroxycarbonate serving as a polymerization initiator are used for the purpose of increasing the average molecular weight of the conjugated diene copolymer without decreasing the polymerization temperature or the amount of the initiator as normally done in conventional processes. The copolymerization illustrated in the Examples of the aforesaid patent is carried out at a temperature ranging from 60 to 105° C., which is sufficient to convert two functional groups (R—O—O—C) of the bifunctional peroxide or the two functional groups (R—O—O—(COO)) of the bifunctional peroxycarbonate into free radicals. As such, the conjugated diene copolymer thus formed is unlikely to become self-crosslikable.

The whole disclosure of U.S. Pat. No. 5,089,576 is incorporated herein by reference.

SUMMARY OF THE INVENTION

The object of the present invention is to provide a self-crosslinkable latex polymer and a method for making the same.

According to one of the aspect of the present invention, there is provided a self-crosslinkable latex polymer that comprises: a polymer chain having a plurality of ethylenically unsaturated units; and a plurality of peroxide functional groups bonded to the polymer chain and having a structure represented by —$R_1$—C—O—O—$R_2$ or —$R_4$—(COO)—C—O—O—$R_5$, wherein $R_1$ and $R_4$ each represents a hydrocarbon group and is bonded to the polymer chain, and $R_2$ and $R_5$ each represents hydrogen or an alkyl group having 1 to 12 carbon atoms.

According to another aspect of the present invention, there is provided a method for making a self-crosslinkable latex polymer. The method comprises copolymerizing different ethylenically unsaturated monomers in the presence of a bifunctional peroxy compound and a reducing agent under a temperature greater than 0° C. but not greater than 40° C. so as to form a polymer chain of the ethylenically unsaturated monomers with peroxide functional groups bonded thereto. The bifunctional peroxy compound is selected from a bifunctional peroxide, a bifunctional peroxycarbonate, and the combination thereof. The bifunctional peroxide has a structure represented by $R_3$—O—O—C—$R_1$—C—O—O—$R_2$ and the bifunctional peroxycarbonate has a structure represented by $R_6$—O—O—(COO)—$R_4$—(OOC)—O—O—$R_5$, wherein $R_1$ and $R_4$ each represents a hydrocarbon group, and $R_2$, $R_3$, $R_5$ and $R_6$ each represents hydrogen or an alkyl group having 1 to 12 carbon atoms.

DETAILED DESCRIPTION OF THE PREFERRED EMBODIMENT

The self-crosslinkable latex polymer of the present invention comprises: a polymer chain having a plurality of ethylenically unsaturated units (each having a structure represented by —CH═CH—); and a plurality of peroxide functional groups bonded to the polymer chain and having a structure represented by —$R_1$—C—O—O—$R_2$ or —$R_4$—(COO)—C—O—O—$R_5$, wherein $R_1$ and $R_4$ each represents a hydrocarbon group and is bonded to the polymer chain, and $R_2$ and $R_5$ each represents hydrogen or an alkyl group having 1 to 12 carbon atoms, and wherein —(COO)— represents a carboxylic group.

Preferably, $R_1$ and $R_4$ each is a cyclohexenylene group, and more preferably, $R_1$ and $R_4$ each is 3,3,5-trimethyl cyclohexenylene group. Preferably, $R_2$ and $R_5$ each is hydrogen.

The self-crosslinkable latex polymer of the present invention can be a nitrile butadiene rubber (NBR) latex polymer. Aside from the peroxide functional groups, the NBR latex polymer further includes a plurality of carboxylic acid functional groups bonded to the polymer chain, and a plurality of nitrile groups bonded to the polymer chain.

The preferred embodiment of the method of making the self-crosslinkable latex polymer includes copolymerizing different ethylenically unsaturated monomers in the presence of a bifunctional peroxy compound and a reducing agent so as to form a polymer chain of the ethylenically unsaturated monomers with the peroxide functional groups bonded thereto. The bifunctional peroxy compound is selected from a bifunctional peroxide, a bifunctional peroxycarbonate, and the combination thereof. The bifunctional peroxide has a structure represented by $R_3$—O—O—C—$R_1$—C—O—O—$R_2$, and the bifunctional peroxycarbonate has a structure represented by $R_6$—O—O—(COO)—$R_4$—(OOC)—O—O—$R_5$, wherein $R_1$ and $R_4$ each represent a hydrocarbon group, and $R_2$, $R_3$, $R_5$, and $R_6$ each represents hydrogen or an alkyl group having 1 to 12 carbon atoms. The copolymerization is carried out at a temperature greater than 0° C. but not greater than 40° C. so as to permit the bifunctional peroxy compound to undergo a redox reaction to convert one of the two functional groups ($R_3$—O—O—C or C—O—O—$R_2$) of the bifunctional peroxide or one of the two functional groups ($R_6$—O—O—(COO) or (OOC)—O—O—$R_5$) of the bifunctional peroxycarbonate into free radicals for initiation of the polymerization and for bonding the other of the two functional groups to the polymer chain of the ethylenically unsaturated monomers.

The reducing agent allows the bifunctional peroxide to undergo the redox reaction under a low temperature, which is only sufficient to convert one of the two functional groups of the bifunctional peroxy compound into free radicals.

Preferably, the polymerization is an emulsion type polymerization.

Preferably, the amount of the bifunctional peroxide employed in the polymerization ranges from 0.05-1.3 parts per 100 parts by weight of the total amount of the ethylenically unsaturated monomers.

Suitable examples of the reducing agent for redox reaction with the bifunctional peroxide include organometallic compounds, such as EDTA-Fe complex.

Suitable examples of the bifunctional peroxide include those disclosed in U.S. Pat. No. 5,089,576.

Suitable examples of the bifunctional peroxycarbonate include those disclosed in U.S. Pat. No. 5,089,576.

The ethylenically unsaturated monomers employed in the method of the present invention include conjugated diene monomers, ethylenically unsaturated nitrite monomers, and ethylenically unsaturated hydrocarbon monomers. Suitable examples of the conjugated diene monomers, the ethylenically unsaturated nitrile monomers, and the ethylenically unsaturated hydrocarbon monomers include those disclosed in U.S. Pat. No. 5,089,576.

The following Example is provided to illustrate the merits of the preferred embodiment of the invention, and should not be construed as limiting the scope of the invention.

Example

Preparation of the Self-Crosslinkable Nitrile Butadiene Rubber (NBR) Latex Polymer A starting solution containing 120 parts by weight of pure water, 51.4 parts by weight of 1,3-butadiene, 44 parts by weight of acrylonitrile, 4.5 parts by weight of methacrylic acid, 0.7668 part by weight of 1,1-di-tert-butylperoxy-3,3,5-trimethylcyclohexane, 1.25 parts by weight of sodium dodecylbenzene sulfonate (30%), 0.25 part by weight of potassium chloride, and 0.0098 part by weight of EDTA-Fe complex was prepared and was subjected to emulsion copolymerization in a reactor for 5 hrs. The copolymerized mixture thus formed was then mixed with 0.625 part by weight of sodium dodecylbenzene sulfonate (30%), 0.125 part by weight of potassium chloride, and 7.983 parts by weight of water. The mixture thus formed was then subjected to a second copolymerization in the reactor for 15 hrs. 0.068 part by weight of N,N-Diethylhydroxylamine was then added into the reactor to terminate the copolymerization. The first copolymerization and the second copolymerization were conducted at a temperature ranging from 15° C. to 28° C. The product thus formed was subjected to stirring for about 2 hrs to eject gas bubbles therefrom so as to obtain the self-crosslinkable NBR latex polymer.

Preparation of a Latex Glove

A glove mold was dipped into a solution of a coagulant for about 5 seconds. The coagulant on the glove mold was dried at 60° C. for about 10 minutes. The glove mold with the coagulant was dipped into the self-crosslinkable NBR latex polymer of the Example for about 5 seconds. The self-crosslinkable NBR latex polymer coated on the glove mold was dried at 130° C. for about 2 minutes, was washed with water at 50° C. for one minute, and was subjected to crosslinking at 130° C. for 26 minutes.

Mechanical Strength Test of the Glove

The mechanical strength of the glove of the Example was tested according to ASTM D412. The test results are shown in Table 1.

TABLE L

| Glove | Tensile strength, MPa | Elongation, % | Modulus at 300%, MPa |
| --- | --- | --- | --- |
| Example | 36.95 | 632 | 3.93 |
| Conventional | 35.2 | 596 | 3.99 |

As shown in Table 1, the glove of the Example has a higher tensile strength and elongation than those of a conventional glove which is formed in a conventional manner, i.e., the latex polymer for preparing the conventional glove does not have the peroxide functional groups and is crosslinked and undergoes vulcanization to form the conventional glove by addition of zinc oxide and sulfur.

Comparative Example

The composition of the starting materials and the reaction conditions for preparing the self-crosslinkable NBR latex polymer of Comparative Example were similar to those of Example 1 except that the emulsion copolymerization was controlled at a temperature of about 40° C. The experiment was unable to continue in the midst of the emulsion copolymerization due to agglomeration of the polymer thus formed, and failed to obtain the self-crosslinkable NBR latex polymer.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A method of making a self-crosslinkable latex polymer, comprising:
copolymerizing different ethylenically unsaturated monomers in the presence of a bifunctional peroxy compound and a reducing agent under a temperature greater than 0° C. but not greater than 40° C. so as to form a polymer chain of the ethylenically unsaturated monomers with peroxide functional groups bonded thereto, the bifunctional peroxy compound being selected from a bifunctional peroxide, a bifunctional peroxycarbonate, and the combination thereof, the bifunctional peroxide having a structure represented by $R_3$—O—O—C—$R_1$—C—O—O—$R_2$ and the bifunctional peroxycarbonate having a structure represented by $R_6$—O—O—(COO)—$R_4$—(OOC)—O—O—$R_6$, wherein $R_1$ and $R_4$ each represents a hydrocarbon group, and $R_2$, $R_3$, $R_5$, and $R_6$ each represents hydrogen or an alkyl group having 1 to 12 carbon atoms, wherein
one of the two functional groups ($R_3$—O—O—C or C—O—O—$R_2$) of the bifunctional peroxide or one of the two functional groups ($R_6$—O—O—(COO) or (OOC)—O—O—$R_5$) of the bifunctional peroxycarbonate is converted into a free radicals for initiating the copolymerization and for bonding the other of the two functional groups to the polymer chain of the ethylenically unsaturated monomers.

2. The method of claim 1, wherein the polymerization is an emulsion polymerization.

3. The method of claim 1, wherein the amount of the bifunctional peroxide employed in the polymerization ranges from 0.05-1.3 parts per 100 parts by weight of the total amount of the ethylenically unsaturated monomers.

4. The method of claim 1, wherein the bifunctional peroxide is 1,1-di-tert-butylperoxy-3,3,5-trimethylcyclohexane.

5. The method of claim 1, wherein the different ethylenically unsaturated monomers are copolymerized under a temperature ranging from 15° C. to 28° C.

* * * * *